Sept. 29, 1925.  A. J. MITKOS  1,555,143
AUTOMATIC AUTOMOBILE ALARM
Filed Feb. 7, 1921    3 Sheets-Sheet 2

INVENTOR.
Anthony John Mitkos.

BY Harry A. Beimer
ATTORNEY.

Sept. 29, 1925. 1,555,143
A. J. MITKOS
AUTOMATIC AUTOMOBILE ALARM
Filed Feb. 7, 1921 3 Sheets-Sheet 3
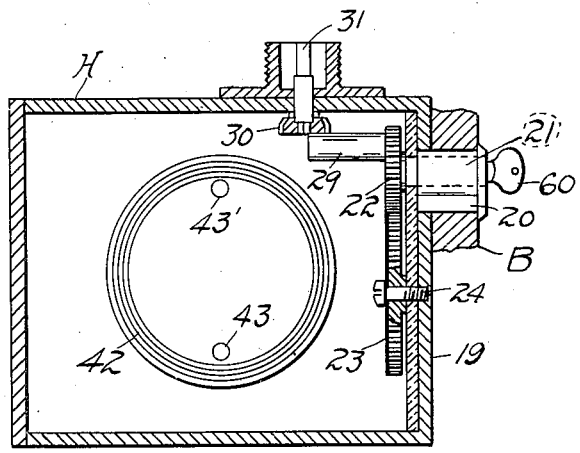
Fig. 5.
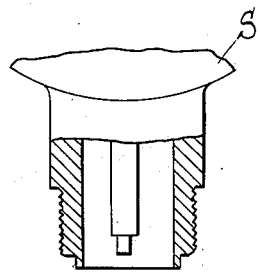
Fig. 7.
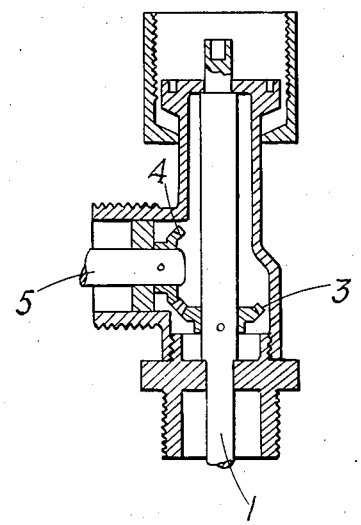
INVENTOR.
Anthony John Mitkos.
BY Harry A. Beimey
ATTORNEY.

Patented Sept. 29, 1925.

1,555,143

UNITED STATES PATENT OFFICE.

ANTHONY JOHN MITKOS, OF ST. LOUIS, MISSOURI.

AUTOMATIC AUTOMOBILE ALARM.

Application filed February 7, 1921. Serial No. 443,128.

*To all whom it may concern:*

Be it known that I, ANTHONY JOHN MITKOS, a citizen of the United States, residing at St. Louis, State of Missouri, have invented certain new and useful Improvements in Automatic Automobile Alarms, of which the following is a full, clear, and exact description, reference being had to the accompanying drawings forming a part hereof.

My invention has relation to improvements in electric automobile alarms adapted to automatically sound when the automobile is moved after the alarm has been set. The primary purpose of the invention is to provide an alarm for automobiles that shall be connected with the speedometer so that when the car is moved a given distance the alarm will sound, thus notifying the owner of the car that the same has been moved by one not authorized to drive it. It is exceedingly common for automobile thieves to board a car that is parked in a street and drive off with the same without being detected, but if a car is equipped with my improved alarm, should any person other than the owner attempt to drive the car away, the alarm will sound after the car has traveled about its own length, and continue to sound until the battery is exhausted or the electric connections broken. A further object is to provide an alarm that will likewise sound if certain parts of the automobile are tampered with, for instance the hood or the spare tire, whereby the owner of the car may also be apprised of this circumstance. My improved alarm may also be set so that it will sound if the car is removed from the garage at any time by one other than the owner, whereby he may be informed of what is commonly called "chauffeur joy riding" that is the removal of the car from the garage by the chauffeur without the consent of the owner. Further and other advantages will be better apparent from a detailed description of the invention in connection with the accompanying drawings in which—

Figure 1:
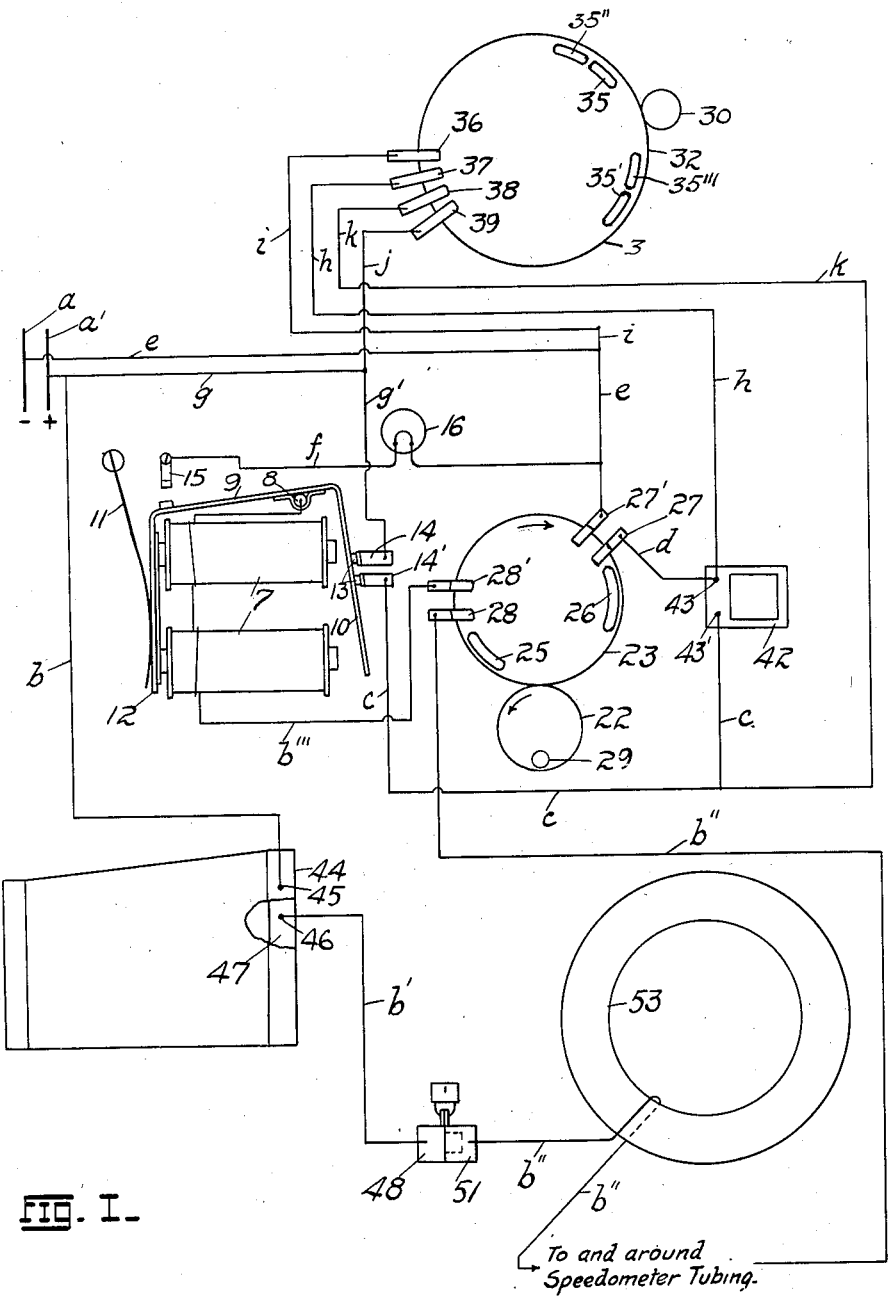
Figure 2:
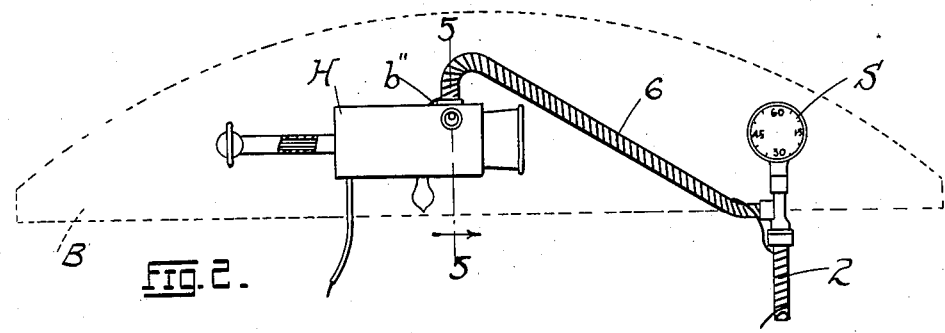
Figure 3:
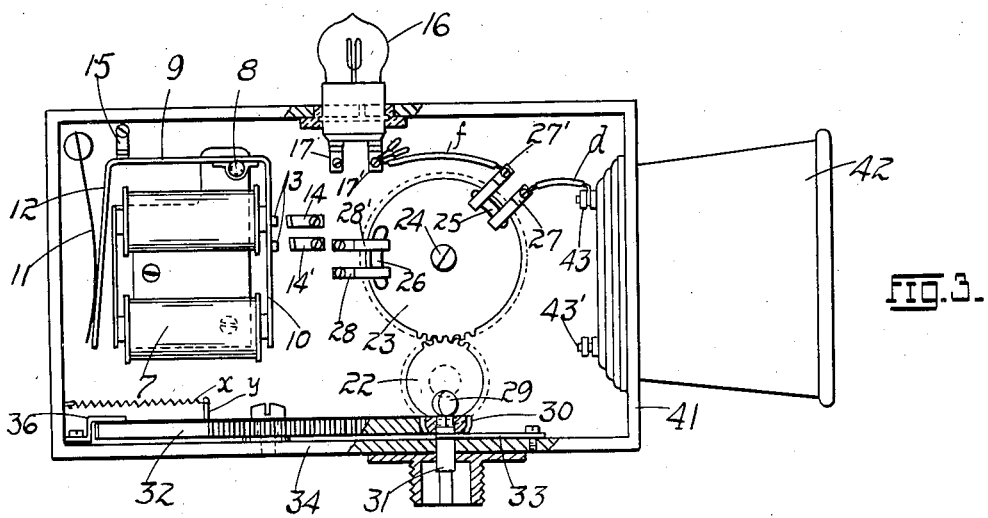
Figures 4, 6:
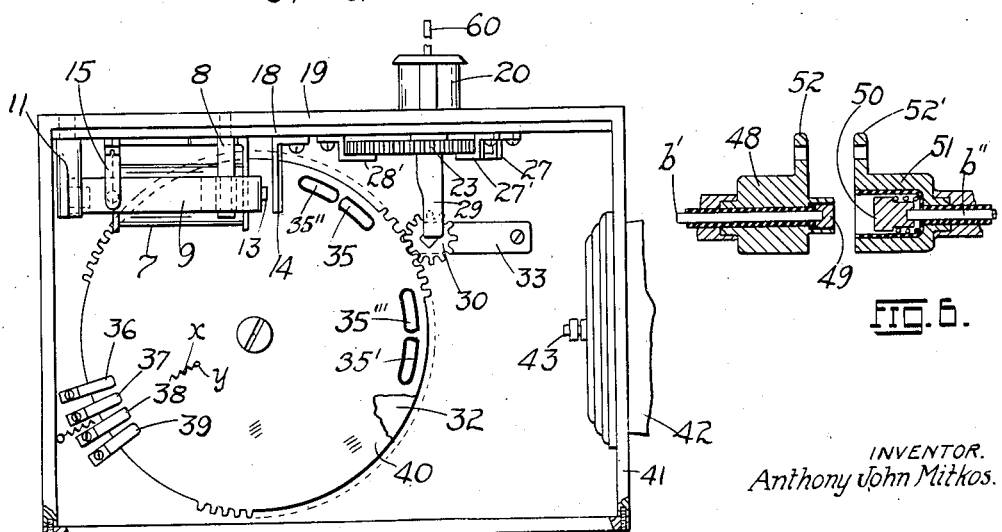

Figure 1 is a diagrammatic view of the alarm mechanism and electrical connections; Fig. 2 is a side elevation of the alarm mechanism housing showing the connection with the speedometer; Fig. 3 is a side elevation of the housing with one wall removed showing the mechanism within the housing; Fig. 4 is a bottom plan of the mechanism within the housing; Fig. 5 is a vertical cross section through the housing taken on the line 5, 5 of Fig. 2; Fig. 6 is a sectional detail of the connection for the conductor adjacent the spare tire; and Fig. 7 is a sectional view of a form of coupling whereby the alarm mechanism is operated in conjunction with the speedometer.

Referring to the drawings S represents a conventional speedometer which is driven from one of the wheels of the vehicle as is well understood in the art by a shaft 1 operating through flexible tubing 2. On the shaft 1 a gear 3 is mounted, and a gear 4 is adapted to mesh with the gear 3, the gear 4 being fixed on a shaft 5, the latter shaft operating within the flexible tubing 6, and being adapted to actuate the alarm mechanism as will presently appear. A housing H is mounted in a suitable location on the instrument board B, and within the housing is arranged an electromagnet 7. Projecting from one wall of the housing is a pin 8 and pivotally mounted on said pin is a U-shaped armature 9, the leg 10 of which is adapted to be attracted to the core of the magnet 7 when the latter is energized. Upon de-energizing the magnet 7 a spring 11 bearing against the leg 12 of the armature operates to swing the latter to a position shown in Fig. 1, whereupon the leg 10 through a breaker point 13 engages a pair of contacts 14, 14'. When the armature 9 is attracted to the magnet, the yoke of the armature 9 will engage a contact 15 mounted in the housing. A signal lamp 16 is mounted in the bottom wall of the housing, and is provided with terminals 17, 17' within the housing. A fiber board or other insulating material 18 is secured to the front wall 19 of the housing, and it is to this wall that the magnet is secured, also the contacts 14, 14'. Projecting through the wall 19 is a lock cylinder 20 of any well known type, traversed by a spindle 21 on the inner ends of which is mounted a pinion 22 which meshes with a gear 23 mounted on a stud 24 secured in the wall 19. The gear 23 is provided with contacts 25 and 26 suitably insulated from the gear, which contacts are adapted to engage wire brackets 27, 27' and 28, 28' respectively, when the gear 23 has been rotated to a position to be hereinafter referred to. The pinion 22 has an eccentric pin 29 projecting from its inner face and extending over a pinion 30 mounted on a spindle 31 adapted to have operative connection with the flexible shaft 5 within the tubing 6. The pinion 30 is held in engagement with a gear 32 by the pin 29, but upon a rotation of the gear 32 and consequent withdrawal of the pin 29 the pinion 30 will be forced upwardly out of engagement with the gear 32 by a flat spring 33 secured to the wall 34 of the housing on which the gear 32 is mounted. It will be observed that a section of the gear 32 comprising approximately 90 degrees of the circumference of said gear is plain, that is there are no teeth in this section, so that when the pinion 30 is in engagement with the gear 32 and the automobile is moved, the gear 32 will be rotated by the pinion and its connection with the speedometer shaft until the plain part of the gear comes opposite the pinion 30, when the gear will no longer be rotated. At this time one or the other of two pairs of contacts 35, 35" or 35' 35''' will make contact with a series of wire brackets 36, 37, 38 and 39 secured to and insulated from the wall 34. Obviously the contacts 35, 35' 35", 35''' are likewise insulated from the gear 32, the latter being covered with a suitable insulating material 40. Mounted in the end wall 41 of the housing is an electric alarm 42 of any well known type, on the inner end of which is a pair of binding posts 43, 43'.

The operation of my invention can be best described by referring to the diagram (Fig. 1). In the diagram the gear 23 is shown in the proper position when the automobile is in the garage, both of the contacts 25 and 26 being clear of the brackets 27, 27' and 28, 28' and the pinion 30 being held in engagement with the gear 32. We will let $a, a'$ represent our line wires, and our signal lamp circuit may be traced as follows:

From the positive wire $a'$ through the conductor $b$ to the hood door 44 of the automobile, the hood door being provided with a contact 45 properly insulated therefrom, which, when said door is in place, is adapted to contact with a contact 46 on the engine frame 47, the circuit then continuing from the contact 46 through the conductor $b'$ to the male member 48 of a wire coupling, the conductor $b'$ being insulated from the coupling 48 and terminating in a contact point 49. The contact point 49 engages a contact point 50 within the female member 51 of the wire coupling, said contact point 50 being insulated from the member 51 and electrically connected with a conductor $b''$ likewise insulated from the wire coupling. The coupling members 48 and 51 are provided with perforated lugs 52, 52' through which a padlock may be passed in order to lock the coupling members together and maintain the points 49 and 50 in contact. The conductor $b''$ is passed around the spare tire 53 that may be mounted on the rear of the automobile, said conductor $b''$ then continuing to the speedometer tubing 2 and 6 around which the same is wrapped, the conductor $b''$ finally entering the housing as shown (Fig. 2) and terminating at the wire bracket 28. If the gear 23 is in the position shown in Fig. 3, which is the proper position when the car is parked on the street (and which position is obtained by rotating the gear 22 a complete revolution from the position of gear 22 shown in Fig. 1) the contact 26 will span the brackets 28, 28' and the contact 25 will span the brackets 27, 27', our circuit then continuing through the conductor $b'''$ through the electromagnet to the post 8, armature 9, contacts 14, 14', conductor $c$, alarm 42, conductor $d$, contact 25, conductor $e$ to the line wire $a$. The closing of the circuit just traced energizes the magnet 7, attracts the armature 9, and closes the gap between the armature and bracket 15, whereupon our light circuit is completed by the conductor $f$ through the lamp 16, conductor $e$ back to the line wire $a$. The lamp circuit, of course, is open when the gear 23 is in the garage position shown in Fig. 1 since the contacts 25 and 26 are clear of the brackets 27, 27' and 28, 28' respectively. However, should an attempt be made to remove the automobile from the garage when the gear 23 is in the garage position, the large gear 32 will be rotated by the pinion 30 held in engagement by the pin 29 until either pair of contacts 35 35" or 35' 35''' (depending upon whether the car is moved forward or backward) engages the brackets 36, 37, 38, 39, which closes the alarm circuit as follows:

From line wire $a'$ to conductor $g$, conductor $g'$, armature leg 10, conductor $c$, alarm 42, conductor $h$, bracket 37, contact 35 (or 35') bracket 36, conductor $i$, conductor $e$, line wire $a$.

When either contact 35 or 35' spans brackets 37 and 36, contact 35" or 35''' will span brackets 38 and 39. However, this will not affect the circuit as may be seen by referring to the diagram Fig. 1.

It is thus seen that when the car is in the garage the same cannot be removed from the garage without turning the pinion 22, (which requires the use of a key 60 to fit the cylinder 20) and releasing the pinion 30 from engagement with the gear 32.

We will now assume that the car is parked in the street, the pinion 22 having been rotated one revolution from its position shown in Fig. 1, and trace the alarm circuit for the parked position shown in Fig. 3. We have already seen that the lamp 16 is lighted, its circuit being closed, when the alarm mechanism is set for the parked position. The alarm circuit for this position is as follows:

From the line wire $a'$ through conductor $g$, conductor $j$, bracket 39, contact 35" (or 35'''), bracket 38, conductor $k$, conductor $c$, alarm 42, conductor d, bracket 27, contact 25, bracket 27′, conductor e, back to line wire a.

The circuit just traced shows that if one attempts to move the car away from the parked position while pinion 22 and gear 23 are in the position shown in Fig. 3, the alarm will be sounded after the car has been moved approximately its own length, this being the ratio between the automobile wheel and gear 32. Obviously while the car is being operated on the streets the alarm circuit should never be closed, consequently at this time the pinion 22 will be rotated half a revolution from the position shown in either Fig. 1 or Fig. 3, thus withdrawing the pin 29 and permitting the spring 33 to raise the pinion 30 out of engagement from the gear 32.

After the car has been moved and the gear 32 rotated through its connections with the speedometer, it may again be restored to its normal position by turning the key 60 so as to disengage pinion 30 from gear 32 whereupon the gear 32 will rotate to its normal position under influence of a coiled spring x which has one end fixed to the gear 32 at y the other end being fixed to the opposite wall of the housing H. When the gear 32 is rotated tension will be imposed on the spring x and the point y will move to a point opposite the center of the gear 32 just short of dead center, and releasing the gear will permit the spring x to restore said gear.

Should anyone tamper with the hood 44 or spare tire 53, thus breaking the connection in the light circuit, the magnet 7 will be de-energized, the armature assume the position as shown in Fig. 1 under the influence of spring 11, and the alarm be sounded by the closing of the following circuit.

Line wire a′, conductor g, conductor g′, brackets 14, 14′, conductor c, alarm 42, conductor d, bracket 27, contact 25, bracket 27′, conductor e back to line wire a.

It is obvious from the foregoing that I have provided a safety alarm to prevent theft of automobiles while not in use that will sound a warning when the automobile is removed from the garage or from a parked position in the street, and will also sound a warning while parked, if the automobile is tampered with. The invention is susceptible to modification, and I do not wish to be restricted to the particular forms shown herein.

The reason I have arranged my circuits so that the signal may be given without any regard to the hood and spare tire is—

The owner does not wish the pilot lamp lighted while the care is in the garage, so he turns the key to disconnect contacts 25 and 26. The main circuit is now open. It is therefore necessary to have another circuit that will give the alarm when solenoid 7 is de-energized. This circuit is the auxiliary alarm circuit composed of conductor a′, wire g, contacts 37, 36, conductors i and e. Then too, the chauffeur may work on the engine of the car without the alarm sounding.

Having described my invention, I claim:

1. In combination with an automobile, a normally closed main circuit including an electromagnetic switch having its electromagnet in said circuit and key controlled means for closing the circuit, a circuit including an alarm and the contacts of said switch, a second normally open circuit including said alarm and controlled by the aforesaid key controlled means, normally open circuit closing means for closing said latter circuit, means for operating the latter by movement of the automobile including driving means for operating the normally open circuit closer.

2. In combination with an automobile a closed protective circuit associated with a part of the automobile to be protected, an electromagnetic switch having its electromagnet in said circuit, a circuit including an alarm and the contacts of said switch, a second normally open circuit including said alarm, normally open circuit closing means for closing said latter circuit, means for operating the latter by movement of the automobile including disengageable driving means and key controlled means for closing the first named circuit and moving the disengageable driving means into driving connection to operate the normally open circuit closer.

In testimony whereof I affix my signature.

ANTHONY JOHN MITKOS.